United States Patent Office 3,454,836
Patented July 8, 1969

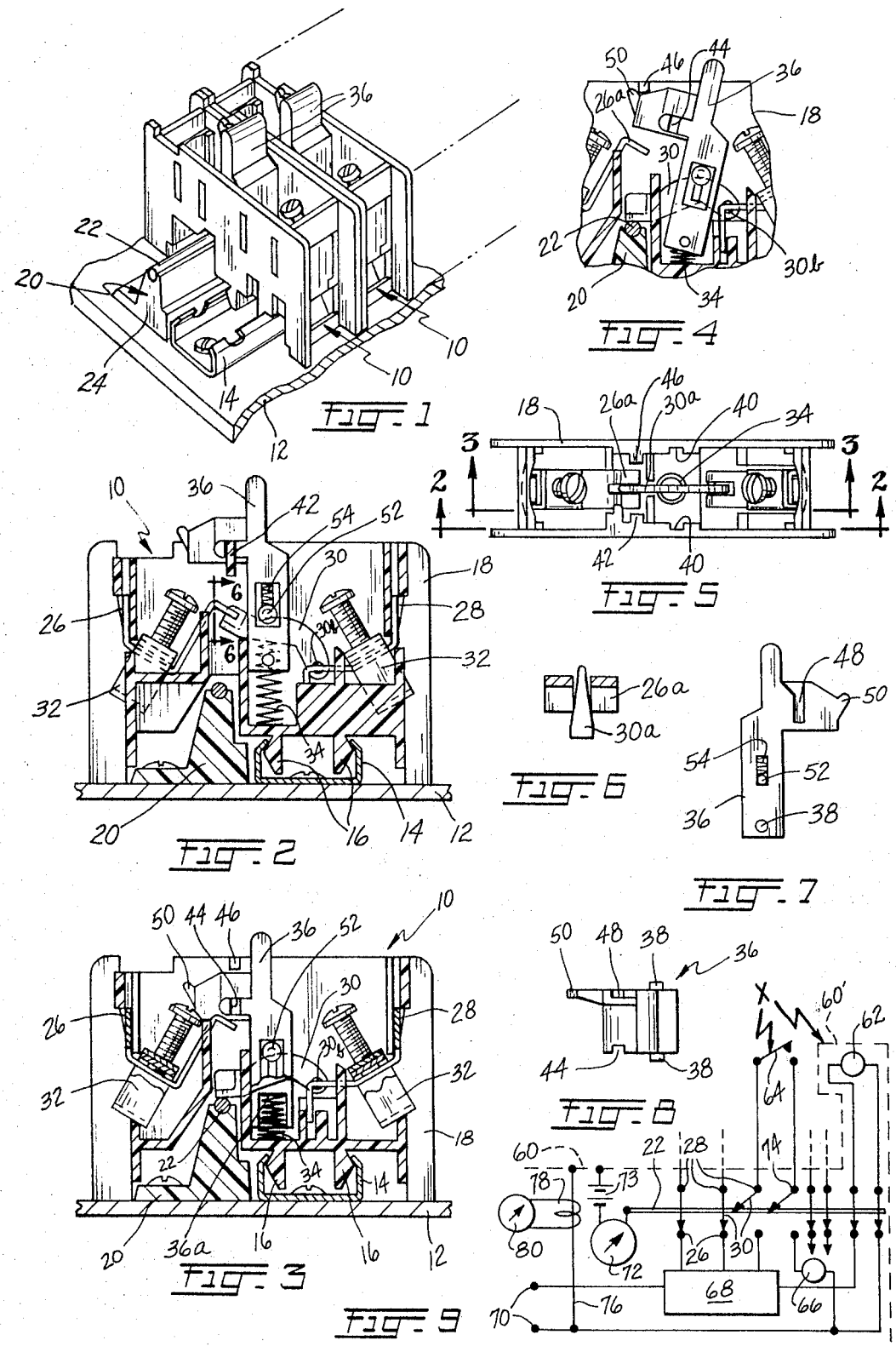

3,454,836
SWITCHING TERMINAL BLOCKS AND ASSEMBLY
Alexander R. Norden, 350 Central Park W., New York, N.Y. 10025
Filed Aug. 14, 1967, Ser. No. 660,439
Int. Cl. H02b *1/04;* H01r *9/04*
U.S. Cl. 317—112                15 Claims

ABSTRACT OF THE DISCLOSURE

A switching terminal block assembly includes a row of switching terminal blocks and an electrical conductor having supporting insulation. Each of the terminal blocks includes a body of insulation with line and load terminals spaced apart on the body with means securing the line and load terminals to the body. The line terminal has a switching contact portion and the insulating body has an opening opposite to the switching contact portion. A contact arm is movably connected to the load terminal and operable between a first position in contact with the contact portion of the line terminal and a second position adjacent the opening and in contact with the electrical conductor. Operating means moves the contact arm selectively to either of the positions. In the second position, the switch enables testing of any selected load circuit for the appearance of a fault-to-ground.

---

The present invention relates to switching means in electrical apparatus for locating ground faults in circuit networks, and to switching terminal block assemblies such as are often used for making connections between the wiring of a control panel and external wiring.

In an example, a terminal block assembly is often made part of a control panel for connecting the various wires of a machine tool to the control panel. Metal shavings and the like are often the cause of trouble in machine-tool wiring, in that they tend to form fault-current paths to ground. Such ground faults may cause erratic operation, they may lead to severe electrical damage, and they represent a hazard to machine attendants. (The term "fault" is used here to cover the range from leakage current-paths to short-circuits.) In a program of preventive maintenance or after a signal appears showing that there is a ground fault somewhere in the whole equipment, the novel terminal block assembly can be used to isolate each portion of the circuit that might develop a ground fault and to test such isolated circuit portion individually or together with other circuit portions that are similarly isolated from the operating circuit.

An important object of the present invention resides in the provision of a new form of terminal block and terminal block assembly equipped with switching means to break any given load circuit and to connect a portion of the broken circuit to a test bus. A related object resides in providing a novel terminal block assembly for isolating a small part of the circuit from the operating circuit and for connecting such an isolated part of the circuit to a test bus, either alone or together with other isolated circuit portions. Each part of the circuit that is equipped for such isolation and test may be (for example) nothing more than a limit switch and the wires connected to it. The novel terminal block assembly makes easy the rapid, routine individual checking of many critical segments of the circuit, separately or in any desired group. As will be seen, various further features of the invention contribute notably toward achieving this object effectively, economically and easily. A related object resides in providing, in electrical apparatus that has plural circuit segments in which ground faults might develop, means for disconnecting or for isolating such circuit segments from the rest of the apparatus and for connecting such circuit segments separately or in selected groups to a ground-fault tester. The switching terminal block assemblies provided pursuant to the foregoing objects were devised especially for such ground-fault testing.

The nature of the invention, including the foregoing and other objects, advantages and novel features will be appreciated more fully from the following description of an illustrative embodiment shown in the accompanying drawings, which form part of the disclosure. As will be seen, the illustrative novel terminal-block assembly includes terminal blocks secured to each other by a common mounting. Each terminal block has a pair of terminals and a movable contact arm that is movably connected to one of the terminals. A test bus extends along a row of such terminal blocks. The movable contact arm ordinarily engages the other terminal of this terminal block, but it is operable out of such engagement and into contact with the test bus. This switching terminal-block assembly constitutes an exemplary means for segregating from a complex circuit any component or segment of the circuit in which a ground fault might develop, and for connecting the segregated components or circuit segments to a ground-fault tester. Springs are arranged to make pressure contact of the movable contact arm to the line terminal and to the test bus, respectively. The switching mechanism may be retained in either of its selective settings. Various other features of construction are included for promoting the success of the novel switching terminal blocks and the assembly thereof with a test bus. An illustrative embodiment of the invention in its various aspects is shown in the accompanying drawings, wherein:

FIGURE 1 is a perspective of a terminal block assembly, including a row of switching blocks, a mounting rail and a test bus, as an embodiment of certain aspects of the invention;

FIGURE 2 is a cross-section of one of the switching terminal blocks in FIG. 1 as viewed from the plane 2—2 in FIG. 5, the switching mechanism being shown in its "closed" position;

FIGURE 3 is a cross-section of one of the switching terminal blocks in FIG. 1 as viewed from the plane 3—3 of FIG. 5, the switching mechanism being shown in its "open-test" position, portions of the manual operator and the terminal wire clamps being broken away for clarity;

FIGURE 4 is a fragmentary cross-section of the switching terminal block as viewed in FIG. 3 but with the manual operator locked in position to maintain connection to the test bus;

FIGURE 5 is a top plan view of one of the switching terminal blocks of FIG. 1, the manual operator being omitted;

FIGURE 6 is an enlarged fragmentary cross-section of the fixed and movable contact portions of the switch as viewed from the plane 6—6 in FIG. 2;

FIGURE 7 is a lateral elevation of the manual operator of the switching terminal block shown in FIG. 2 but viewed from the rear;

FIGURE 8 is a top plan view of the manual operator of the switching terminal block of FIG. 2; and FIGURE 9 is a wiring diagram of electrical apparatus having a ground-fault tester and incorporating switching means, especially in the form of FIGS. 1-8, for segregating from the operating circuit any given segment of the circuit and for connecting such segment to the ground-fault tester.

In FIG. 1, two switching terminal blocks 10 are shown secured to base plate 12 by a mounting rail 14. The top edges of the mounting-rail side walls slope toward each other (FIG. 2) to interlock with complementary mounting legs 16 of insulating body 18. In this illustrative embodiment, body 18 is of nylon so as to be slightly yielding and electrically non-tracking. The yielding property of the insulation helps in driving legs 16 of body 18 into the mounting rail, and it helps in assembling the switching terminal block.

A test bus assembly 20 extends along rail 14. The test bus assembly includes a wire 22 on an insulating support 24, the wire being partly exposed but being captive in the insulating support. Suitable means such as an extra terminal block 10 is used for making connection to wire 22, for the test circuit.

In FIG. 2, line terminal 26 and load terminal 28 at the opposite ends of body 18 are bridged by movable contact arm 30. The switching terminal block is used in this condition normally, for providing a current path between wires (FIG. 9) secured to terminals 26 and 28 by wire clamps 32. My Patents Nos. 3,253,251 and 3,259,876 show further details of terminal blocks having mounting legs locked to a mounting rail, and having wire clamps as in the illustrative embodiment of this invention.

Terminals 26 and 28 are locked firmly in place in block 18 by the various formations of the insulating body as shown. In the closed condition of the switching terminal block, arm 30 (which is of tapered cross-section at its movable end 30a) is tightly received in the slotted end portion 26a of terminal 26. See FIGS. 5 and 6.

At the opposite end, arm 30 has a pivot 30b at a corner formed in terminal 28. Compression coil spring 34 provides contact pressure between the ends of arm 30 and the respective terminals 26 and 28.

Manual operator 36 is vertically slidable in block 18. Short guide pins 38 (FIG. 8) on the operator are received in groves 40 extending from top to bottom of the opposite walls of body 18. Further, a short guide part 42 in one wall of body 18 (FIGS. 2 and 5) is received in lateral slot 44 of the manual operator. At the opposite wall of body 18 there is a small detent 46 that works along groove 48 in the manual operator when going from the closed condition of FIG. 2 to the "open-test" condition of FIG. 3. Detent 46 blocks the top edge of arm 50 of operator 36 in the locked "open-test" condition of the switching mechanism shown in FIG. 4. In the "closed" condition of the switching mechanism, the closed lower end of groove 48 is obstructed by detent 46 and thus prevents operator 36 from lifting out of body 18.

Spring 34 bears against the lower edge of switch arm 30 (in FIG. 2) and is held in alignment with arm 30 by a passage in the bottom of operator 36. The operator 36 is slotted to form two legs at the opposite sides of arm 30. Across the curved upper edge of arm 30 there is a pin 52 that is biased downward by compression coil spring 54 which is captive in the operator 36. Pin 52 is movable along slots in the opposite sides of operator 36, which is made of insulation.

When the switching mechanism is operated from the closed condition of FIG. 2 to the "open-test" condition of FIG. 3, operator 36 is depressed manually and remains down only while it is held down. Operator 36 is guided for vertical sliding by pins 38 in grooves 40 and by rib 42 and detent 46 in grooves 44 and 48, respectively.

For locking the contact arm 30 down against conductor 22, operator 36 is swung to the right (FIG. 4) so that detent 46 overlies arm 50. Both in FIG. 3 and in FIG. 4, spring 54 applies pressure to arm 30 to insure contact with test wire 22. In the depressed position of member 36, a ledge 36a presses spring 34 away from arm 30. Thus, spring 34 is compressed by member 36, and does not reduce the spring pressure applied to contact arm 30 by spring 54. In the "closed" condition of the switching mechanism (FIG. 2) spring 34 applies contact pressure between the engaging contact portions 26a and 30a (FIGS. 2 and 6). At this time, there is clearance between the closed end of grove 48 and detent 46, thus avoiding any interference with the contact pressure. Also, at this time pin 52 has reached the lower end of the slot in member 36 and prevents spring 54 from applying pressure to arm 30.

A large number of switching terminal blocks 10 are usually used, locked in place by rail 14 and legs 16 and extending in a row along elongated "test" conductor 22. Each insulating body 18 has an opening above conductor 22 and below contact portion 26a, and it is through this opening that the contact portion 30a moves to reach conductor 22 that is external to the switching terminal block.

As many blocks 10 as desired may be assembled to rail 14 along test bus 22. In their normal "closed" condition of FIG. 2, they act as ordinary terminal blocks for connecting pairs of wires secured to terminals 26 and 28. If trouble should develop in the circuits connected to load terminals 28, the connection provided by each terminal block can be opened individually, by manually operating member 36. This operation can be momentary, or it can be maintained by locking detent 46 as in FIG. 4.

In the open condition of the switching mechanism, arm 30 presses against conductor 22. Test instruments can be used between conductor 22 and ground or any other part of the circuit, for investigating each individual circuit connected to a respective terminal 28.

FIG. 9 shows the terminal block assembly of FIGS. 1–8 in an electrical circuit having a ground-fault tester. The circuit of FIG. 9 includes a first portion below the horizontal dotted line 60, being the electrical control and montoring apparatus commonly assembled in a control panel. A second portion of the circuit above line 60 represents the external parts of the circuit. In this example, the external circuit includes a motor 62 that has a grounded metal frame. Broken line 60' represents the metal frame as well as the usual grounding wire or the conduit extending to the control panel. Dotted line 60 mentioned previously represents the metal structure of the control panel and is joined to structure 60'.

The external circuits may be many. One external circuit (additional to motor 62) is a limit switch 64 connected in series with relay 66 of the control panel. Switch 64 is connected to the load terminals 28 of two switching terminal blocks appearing in detail in FIGS. 1–8. Line terminal 26 of one of these terminal blocks extends via control apparatus 68 to power input terminals 70. Control apparatus 68 may be a timer having a series of cam contacts, and it may incorporate contacts of relay 66 and any desired control, signalling and protective devices not per se significant for present purposes.

The manually operable selector arms 30 of the terminal blocks are normally set to bridge respective line and load terminals 28 and 26. Arms 30 of the terminal blocks related to the circuit extending to switch 64 is shown switched to conductor 22 which forms a common third terminal of all the terminal blocks. The third switch terminals of the terminal blocks are connected in common to a ground-fault detector circuit diagrammatically represented by the indicating instrument 72 and battery 73.

There are often many circuits having external circuit portions comparable to limit switch 64 which are connected to the control panel via the switching terminal blocks described above, eight such terminal blocks being represented in FIG. 9. These external circuits might have return connections to the panel via plug-in connectors, but in this example each segment of the external circuitry in which a ground-fault might develop is provided with two switching blocks 10. If there were two external limit switches connected in series, each should have separate wires to a respective pair of switching terminal blocks to facilitate individual testing of each such limit switch.

A ground connection 76 extends from ground structure 60 to one side of the power input line. A current transformer 78 and an indicating instrument 80 constitute an elementary ground fault indicator for the whole apparatus.

In case a fault X to ground should develop at switch 64, there would be an indication of it at instrument 80, in the normal condition of all the switching terminal blocks. To test all the circuits for locating the fault, arms 30 of the terminal blocks connected to each external device such as limit switch 64 are shifted to the test position. Each arm 30 breaks the circuit, but using the pair of switch arms 30 completely isolates the external device 64 for purpose of individual testing of that device. At this time, only those arms 30 associated with device 64 are switched to the test bus 22. If this device is not faulty, its arms 30 are switched away from the test bus and then the pair of arms 30 associated with another external device are switched to the test bus, and so the external devices can be tested individually in succession.

It sometimes happens that ground leakage develops to the point where indicator 80 signals hazardous condition, and yet no one external device (e.g. switch 64) is shown to be dangerously faulty. In such circumstances, the switch arms 30 of groups of external devices can be operated to the test position concurrently, so that the combined leakage of a selected group of external devices can be checked. This type of test is less important where element 72 is an ohmmeter than where a neon-tube indicator is used for ground testing.

It was noted above that device 68 may incorporate timing contacts. Such contacts may be open when testing for ground faults is desired, and at that time an external device 64 having a ground fault would not produce an indication at instrument 80. The complete isolation of any particular external segment of the circuit that can be achieved with the terminal block assembly, and its connection to the ground tester, represent a distinctive feature of the apparatus.

The foregoing illustrative embodiment of the invention represents an exemplary construction that is well suited to achieve the purposes of the invention. Its many novel features may be variously applied, and its details may be modified in many ways by those skilled in the art without departing from the spirit of the invention. Accordingly, the invention should be construed broadly in accordance with its full spirit and scope.

What is claimed is:

1. A switching terminal block assembly, including a row of switching terminal blocks and an electrical conductor having supporting insulation and being disposed along and common to said row of switching terminal blocks, each of said terminal blocks including a body of insulation, line and load terminals spaced apart on said body and having means for securing line and load conductors thereto, said line terminal having a stationary switching contact portion and said insulating body having an opening opposite to said switching contact portion and adjacent to said electrical conductor, a contact arm movably connected to said load terminal and operable between a first position in contact with said contact portion of said line terminal and a second position adjacent said opening and in contact with said electrical conductor, and operating means for moving said contact arm selectively to either of said positions.

2. A switching terminal block assembly in accordance with claim 1, further characterized in that means is provided for securing said bodies individually in assembly to said electrical conductor.

3. Switching apparatus in accordance with claim 1, wherein said operating means includes a biasing spring for operating said contact arm to one of said positions and a manual operator for moving said contact arm to the other of said positions.

4. Switching apparatus in accordance with claim 3, wherein said operator includes an insulating member and a second spring acting between said insulating member and said contact arm for developing contact pressure in said other position of said contact arm, further including a detent selectively cooperable with said insulating member for holding said member in said other position.

5. Switching apparatus in accordance with claim 1, wherein said operating means includes a spring for biasing said movable contact arm against said contact portion of said line terminal, and a manual operator for driving said contact arm opposite to said spring bias for engaging said electrical conductor.

6. Switching apparatus in accordance with claim 3, further including a fixed detent for said manual operator, said manual operator being operable in one direction for operating said contact arm toward said electrical conductor and said manual operator being thereupon operable transverse to said one direction into locking cooperation with said detent.

7. Switching apparatus in accordance with claim 1, wherein said operating means includes a manually engageable insulating member, a first spring acting on said contact arm when in said first position for biasing said contact arm into contact with said contact portion of the line terminal and a second spring acting between said insulating member and said contact arm for transmitting pressure applied to said insulating member to bias said contact arm against said electrical conductor in said second position of said contact arm, said insulating member having a portion acting on said first spring in said second position of said contact arm to remove the bias thereof from said contact arm, and a detent selectively cooperable with said insulating member for arresting the latter when said contact arm is in said second position.

8. A switching terminal block assembly in accordance with claim 1, wherein said terminal blocks and said electrical conductor are mounted on a common panel, said insulating bodies having aligned recesses for receiving said electrical conductor.

9. A switching terminal block assembly in accordance with claim 1, wherein said electrical conductor is of substantially uniform cross-section along said row of terminal blocks.

10. A switching terminal block assembly in accordance with claim 1, wherein said row of terminal blocks form a protective cover over said electrical conductor common to said terminal blocks.

11. A switching terminal block assembly in accordance with claim 1, including a ground-fault tester connected to said electrical conductor common to said terminal blocks.

12. Electrical apparatus including a plurality of switches, each having line, load and third terminals and selective means manually operable to connect said load terminal either to said line terminal or to said third switch terminal, means forming a plurality of circuits connected to the line and load switch terminals and including circuit portions connected to said load terminals which circuit portions are susceptible of developing faults to ground, and ground fault detection means connected between ground and said third switch terminals in common and effective to detect a ground fault that may develop in any of said circuit portions when connected thereto by selective operation of the related manually operable means.

13. Electrical apparatus in accordance with claim 12 comprising means including said switches for completely isolating at least certain of said circuit portions from said plurality of circuits.

14. A switching terminal block adapted to make contact with an external conductor adjacent to the terminal block, including a body of insulating, line and load terminals spaced apart on said body and having means for securing line and load conductors thereto, said line terminal having a stationary switching contact portion and said insulating body having an opening opposite to said switching contact portion at which the external conductor may be disposed, a movable contact arm connected to said load terminal and operable between a first position in contact with said contact portion of said line terminal and a second position adjacent said contact arm selectively to either of said positions.

15. A switching terminal block in accordance with claim 14, wherein said operating means includes a spring for biasing said movable contact arm against said contact portion of said line terminal, and a manual operator for driving said contact arm opposite to said spring bias for engaging said elongated conductor.

References Cited

UNITED STATES PATENTS

| | | | |
|---|---|---|---|
| 3,200,228 | 8/1965 | Locher | 312—119 XR |
| 3,253,251 | 5/1966 | Norden | 339—198 |
| 3,259,876 | 7/1966 | Norden | 339—198 |

ROBERT K. SCHAEFER, *Primary Examiner.*

J. R. SCOTT, *Assistant Examiner.*

U.S. Cl X.R.

339—198